(12) United States Patent
Pappachan et al.

(10) Patent No.: US 9,571,280 B2
(45) Date of Patent: Feb. 14, 2017

(54) APPLICATION INTEGRITY PROTECTION VIA SECURE INTERACTION AND PROCESSING

(71) Applicant: Intel Corporation, Santa Clara, CA (US)

(72) Inventors: Pradeep M. Pappachan, Hillsboro, OR (US); Reshma Lal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,859

(22) PCT Filed: Jun. 4, 2013

(86) PCT No.: PCT/US2013/044140
§ 371 (c)(1),
(2) Date: Dec. 17, 2013

(87) PCT Pub. No.: WO2014/196964
PCT Pub. Date: Dec. 11, 2014

(65) Prior Publication Data
US 2014/0359305 A1    Dec. 4, 2014

(51) Int. Cl.
*H04L 29/06*    (2006.01)
*H04L 9/14*    (2006.01)

(52) U.S. Cl.
CPC .............. *H04L 9/14* (2013.01); *H04L 2209/60* (2013.01)

(58) Field of Classification Search
CPC ... H04L 9/14; H04L 2209/60; H04N 21/4367; H04N 21/4408; H04N 9/14; G06F 21/10
(Continued)

(56) References Cited

U.S. PATENT DOCUMENTS

2004/0165721 A1    8/2004  Sano et al.
2004/0255037 A1    12/2004 Corvari et al.
(Continued)

FOREIGN PATENT DOCUMENTS

EP     1 667 398 A1    6/2006
WO    2014/196963 A1    11/2014

OTHER PUBLICATIONS

International Search Report and Written Opinion received for PCT Patent Application No. PCT/US2013/044112, mailed on Feb. 18, 2014, 14 pages.

(Continued)

*Primary Examiner* — Dao Ho
(74) *Attorney, Agent, or Firm* — Grossman, Tucker, Perreault & Pfleger, PLLC

(57) ABSTRACT

The present disclosure is directed to application integrity protection via secure interaction and processing. For example, interaction with a user interface in a device may result in input information being generated. Following encryption, the input information may be conveyed to an application executing in a secure processing environment. The encrypted input information may be received, decrypted and processed by the application. An example application may include a secure controller component, a secure model component and a secure view component. The secure controller component may, for example, provide change instructions to the secure model component based on the decrypted input information. The secure model component may then, if necessary, provide a change notification to the secure view component based on the change instructions. The secure view component may then generate output information, which may be encrypted prior to being provided to the user interface for decryption, processing and presentation.

17 Claims, 5 Drawing Sheets

(58) Field of Classification Search
USPC .......................................... 713/189; 380/201
See application file for complete search history.

(56) References Cited

U.S. PATENT DOCUMENTS

| | | |
|---|---|---|
| 2005/0163316 A1 | 7/2005 | Wing |
| 2007/0011344 A1 | 1/2007 | Paka et al. |
| 2008/0077592 A1 | 3/2008 | Brodie et al. |
| 2008/0148063 A1 | 6/2008 | Hanko et al. |
| 2008/0154775 A1 | 6/2008 | Soukup |
| 2009/0245521 A1 | 10/2009 | Vembu et al. |
| 2009/0296929 A1 | 12/2009 | Wachtfogel et al. |
| 2009/0316889 A1* | 12/2009 | MacDonald et al. ......... 380/201 |
| 2011/0055886 A1 | 3/2011 | Bennett et al. |
| 2011/0246764 A1* | 10/2011 | Gamez .................... G06F 21/41 713/155 |
| 2012/0079282 A1 | 3/2012 | Lowenstein et al. |
| 2012/0093319 A1 | 4/2012 | Saito |
| 2012/0221853 A1 | 8/2012 | Wingert et al. |
| 2012/0260094 A1 | 10/2012 | Asim et al. |
| 2013/0006866 A1 | 1/2013 | Pendakur et al. |
| 2013/0028416 A1 | 1/2013 | Gagnon et al. |
| 2013/0091353 A1 | 4/2013 | Zhang et al. |
| 2015/0143118 A1 | 5/2015 | Sheller et al. |
| 2015/0304736 A1 | 10/2015 | Lal et al. |

OTHER PUBLICATIONS

International Search Report received for PCT Patent Application No. PCT/US2013/044140, mailed on Mar. 6, 2014, 3 pages.
International Preliminary Report on Patentability received for PCT Application No. PCT/US2013/044158, mailed on Dec. 17, 2015, 20 pages.
International Preliminary Report on Patentability received for PCT Application No. PCT/US2013/044112, mailed on Dec. 17, 2015, 14 pages.
International Preliminary Report on Patentability received for PCT Application No. PCT/US2013/044140, mailed on Dec. 17, 2015, 10 pages.

* cited by examiner

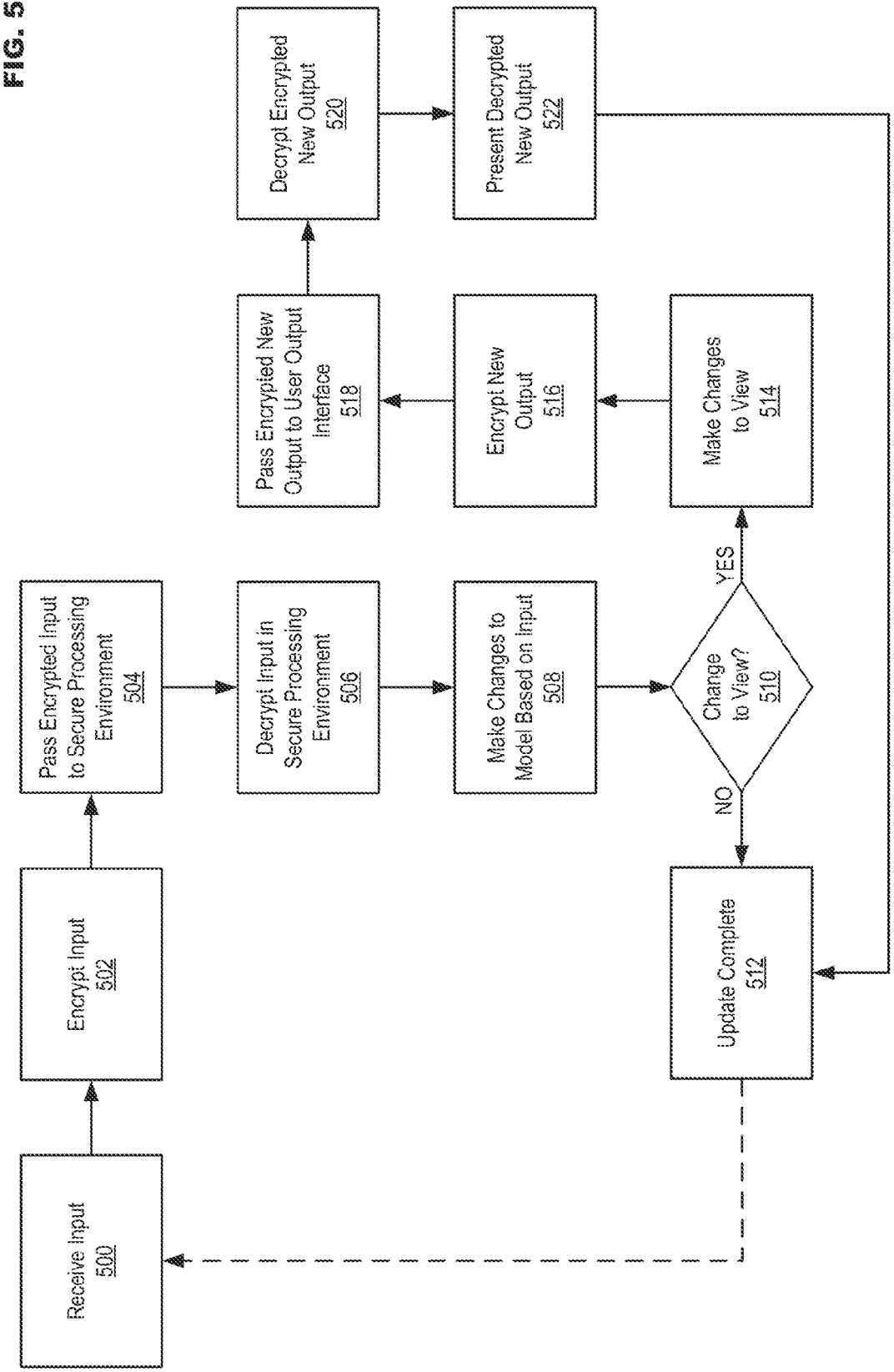

APPLICATION INTEGRITY PROTECTION VIA SECURE INTERACTION AND PROCESSING

This invention was made with Government support under contract number FA7000-11-2-0001 awarded by the Department of Homeland Security. The Government has certain rights in this invention.

TECHNICAL FIELD

The present disclosure relates to security for computers, and more particularly, to a program architecture that helps to protect software during both data entry and presentation.

BACKGROUND

Software may be structured based on a Model-View-Controller (MVC) architecture. MVC may separate the presentation layer of an application (e.g., view component) from the state and processing logic of the application (e.g., model component) and the user interface of the application (e.g., controller component). In an example of operation, a user may interact with the control component, the control component interaction generating new input for the model component that may possibly cause processing logic in the model component to make changes. Changes made in the model component may result in corresponding changes that need to be made to the view, and in this regard the model component may send notifications that cause the view component to be updated. An updated version of the view may then be presented to the user, who, based on the updated view presentation, may further interact with the control component, causing the above operations to loop back to the control phase. The MVC architecture is capable, flexible, etc. in that the components may be modified, updated. etc. to improve the overall performance of the application without requiring a total rebuild.

However, while extremely functional, the modularity of applications based on MVC architecture may include some inherent vulnerability that may be attributable to the manner in which information is exchanged between the different components. For example, input information resulting from user interface interaction may be intercepted, changed, etc. prior to being received by the control component. Application state, behavior, etc. maintained by the model component may be affected by malware (e.g., malicious or malevolent software) running at a high privilege level (e.g., with access to the application's memory). In addition, information output by the application view component may be susceptible to interception, change, etc. by malware before being presented. Advances in hacking tools/strategies are allowing hackers to exploit these vulnerabilities, and thus, make software designed in this manner less useful, especially for applications handling confidential information.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 5 illustrates example operations for application integrity protection via secure interaction and processing in accordance with at least one embodiment of the present disclosure.

Figure 1:
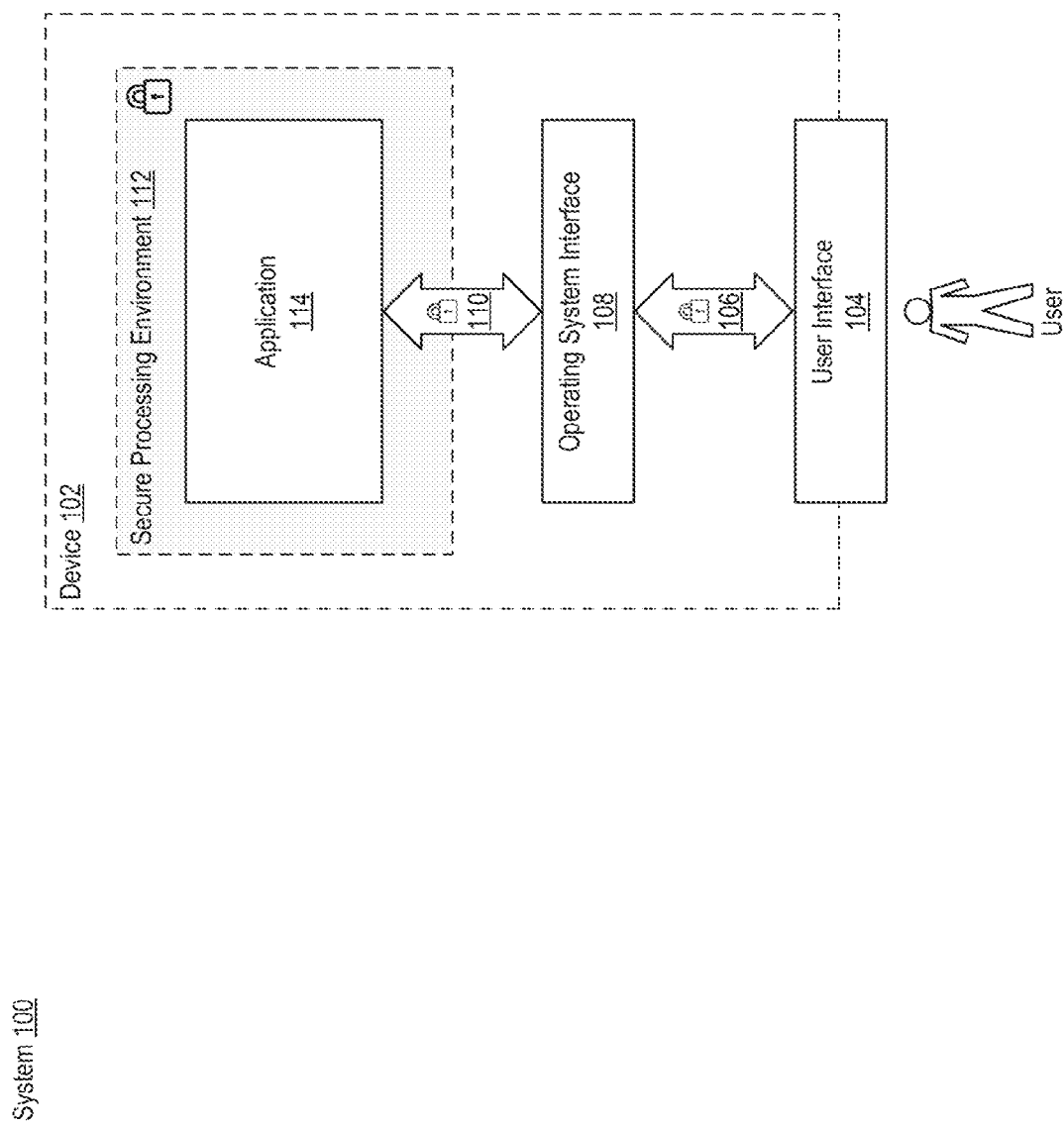
FIG. 1 illustrates an example system for application integrity protection via secure interaction and processing in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to application integrity protection via secure interaction and processing. An application may be secure in that user interaction, information transmission and processing related to the application may be protected from outside interception, alteration, etc. In one embodiment, interaction with a user interface may result in input information being generated. Following encryption, the input information may be conveyed to an application executing in a secure processing environment protected from outside influence. The encrypted input information may be received in the secure processing environment, decrypted and then processed by the application. An example application may include a secure controller component, a secure model component and a secure view component. The secure controller component may, for example, provide change instructions from the decrypted input information to the secure model component. The secure model component may then, if necessary, provide change notifications to the secure view component based on the change instructions. The secure view component may then generate output information, which may be encrypted prior to being provided to the user interface for decryption, processing and presentation.

In one embodiment a device may comprise, for example, a user interface, an operating system (OS) interface and a secure processing environment. The user interface may be incorporated within or coupled to the device. The OS interface may be to receive encrypted input information from, and to provide encrypted output information to, the user interface. The secure processing environment may include at least an application, and may be to receive the encrypted input information from the operating system interface, decrypt the encrypted input information using a first encryption protocol, process the encrypted input information using the application to generate output information, encrypt the output information using a second encryption protocol, and provide the encrypted output information to the OS interface.

An example user interface may include at least a user input interface to encrypt input information using the first encryption protocol, the input information being generated by user interaction with the user input interface, and a user output interface to decrypt the encrypted output information using the second encryption protocol and to present the decrypted output information. An example user output interface may include at least output processing resources to decrypt the encrypted output information using the second encryption protocol, process the decrypted output information into presentation information and encrypt the presentation information using a third encryption algorithm. The user output interface may further include output equipment to decrypt the encrypted presentation information using the third encryption protocol and present the decrypted presentation information. In one example implementation consistent with the present disclosure, the second encryption protocol may be a Protected Audio Video Path (PAVP) protocol and the third encryption protocol may be a High-bandwidth Digital Copyright Protection (HDCP) protocol.

An example application may include at least a secure controller component, a secure model component and a secure view component. The secure controller component may be to, for example, receive the encrypted input information from the operating system interface, decrypt the encrypted input information and provide change instructions from the decrypted input information to the secure model component. The secure model component may be to, for example, receive the change instructions from the secure controller component and, if necessary, provide change notifications to the secure view component based on the received change instructions. The secure view component may be to, for example, receive change notifications from the secure model component, generate the output information based on the received change notifications, encrypt the output information using the second encryption protocol and provide the encrypted output information to the OS interface. In an alternative example implementation consistent with the present disclosure, the application may comprise at least a secure controller component and a secure view component to interact with a secure model component in a second secure processing environment residing on a second device coupled to the device via a wired or wireless communication network. A method consistent with at least one embodiment of the present disclosure may include, for example, receiving input information via user interface in a device, encrypting the input information in the user interface, the input information being encrypted using a first encryption protocol, passing the encrypted input information through an OS interface in the device to a secure processing environment in the device, the secure processing environment comprising at least an application, decrypting the encrypted input information using the first encryption protocol, processing the decrypted input information using the application to generate output information, encrypting the output information using a second encryption protocol and providing the encrypted output information to the user interface through the OS interface.

FIG. 1 illustrates an example system for application integrity protection via secure interaction and secure processing in accordance with at least one embodiment of the present disclosure. Initially, it is important to note that while various examples in the following disclosure will disclose interaction with a user, the user is illustrated merely for the sake of explanation herein and is not considered integral to any of the disclosed example embodiments. Example system 100 may comprise, for example, device 102. Examples of device 102 may include a mobile communication device such as a cellular handset or a smartphone based on the Android® OS, iOS®, Windows@ OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a stationary computing device such as a desktop computer, a set-top device, a smart television (TV), an audio and/or video electronic conferencing system, or practically any other computing device that executes applications.

Device 102 may comprise, for example, user interface 104. OS interface 108 and secure processing environment 112. User interface 104 may include, for example, any input and/or output apparatuses that may be employed by a user to input information into device 102 (e.g., type or speak information, point to objects on a display, etc.) or to comprehend information from device 102 (e.g., read text, see images, hear sound, feel tactile feedback, etc.) from device 102. User interface 104 may also include any software resources such as, for example, processing resources that are needed to operate the input or output apparatuses. Consistent with embodiments of the present disclosure, some of user interface 104 may be external to device 102, and may be configured to communicate with device 102 via a wired or wireless connection (e.g., an external keyboard, mouse, monitor, etc.). OS interface 108 may comprise hardware buses, interfaces, etc., as well as any related software, for routing information to different areas of device 102. In one example of operation, OS interface 108 may serve as a bridge between user interface 104 and secure processing environment 112 by handling secure communication 106 and secure communication 110. For example, secure communications 106 and 110 may be the same (e.g., may include the same unaltered content) when OS interface 108 simply performs pass-through routing for secure communications in device 102.

Secure processing environment 112 may include, for example, a mode of operation in device 102 wherein application 114 may execute with minimal chance of being compromised by malware. Application 114 may be executed within secure processing environment 112 to protect the integrity of the information supplied to application 114 as input, the manner in which application 114 executes and any information that may be output by application 114. Information output by application 114 (e.g., information for presentation by user interface 104) may be protected by using a similar communication strategy to that used to provide input information to application 114 including, for example, secure communication 110. OS interface 108 and user interface 104. Upon receiving the output information, user interface 104 may present the output information.

An example scenario that may be useful for explaining embodiments consistent with the present disclosure is a banking application (e.g., an application with which a user may be able to get information about their personal or business bank accounts, affect changes, etc.). In this regard, the user may initially supply access information (e.g., username, password, account numbers, etc.). This information may be entered via user interface 104. Inputting this type of private or confidential information may be a vulnerability in existing systems as malware may be able to log keystrokes, intercept pointer selections, etc., and thus, gain access to sensitive information. However, in example system 100 the input information may be encrypted as it is entered via user interface 104, and may then be supplied to OS interface 108 in encrypted form as shown at 106. The encrypted input information may then be forwarded to application 114 as shown at 110. The encrypted input information may only be decrypted once received within secure processing environment 112, providing protection for its content and also the execution of application 114 which may access to databases to find account balances, process financial transactions (e.g., pay bills, transfer funds, etc.). All of these activities, which may be "out in the open" in an existing system may be protected in accordance with embodiments of the present disclosure. Then, when output information is generated (e.g., financial reports, transaction confirmations, etc.), the output may be encrypted prior to transmission back to OS interface 108 as shown at 110. The encrypted output information may then be sent to user interface 104, as shown at 106, for presentation to the user. As the output information may also contain confidential information (e.g., bank account numbers, account balances, various identification information, etc.) that would otherwise be vulnerable in existing systems, in at least one embodiment consistent with the present disclosure the output information may stay encrypted until just prior to presentation to help ensure that its contents remain private.

Figure 2:
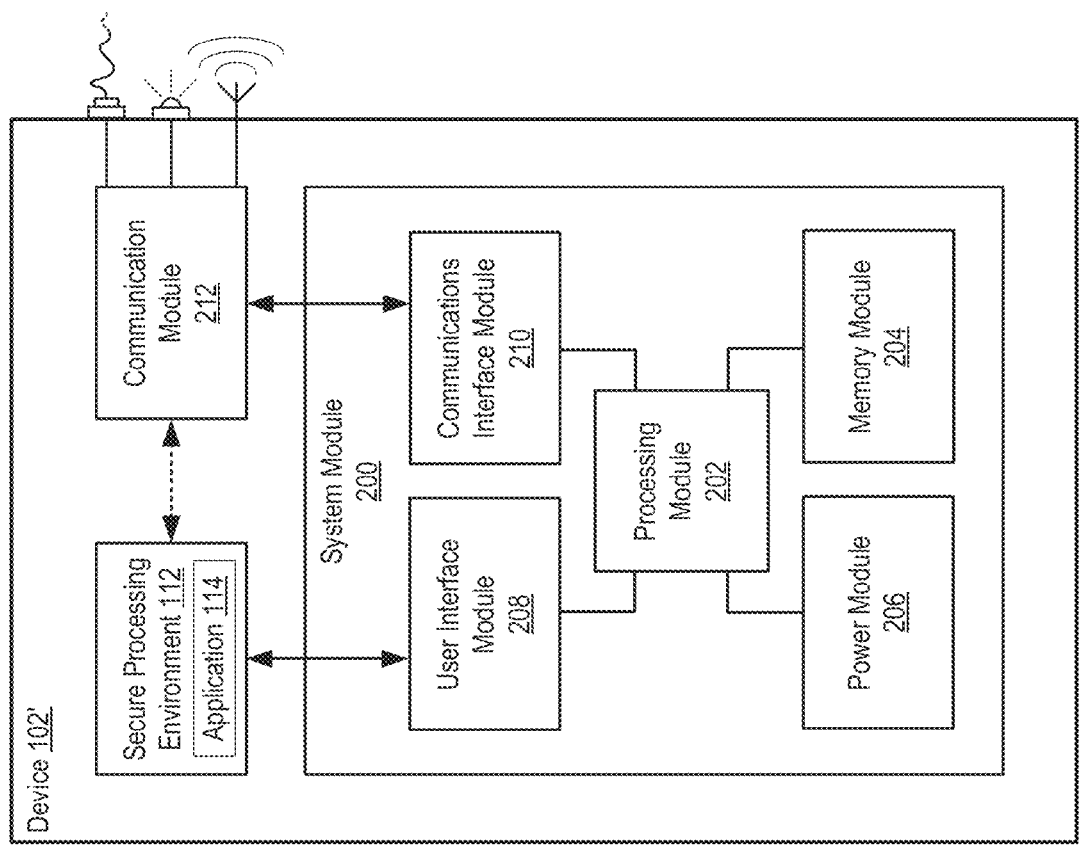
FIG. 2 illustrates an example configuration for a device on which application integrity protection via secure interaction and processing may be implemented in accordance with at least one embodiment of the present disclosure.

FIG. 2 illustrates an example configuration for device 102' on which application integrity protection via secure interaction and processing may be implemented in accordance with at least one embodiment of the present disclosure. In particular, device 102' may be able to perform example functionality such as disclosed in FIG. 1. However, it is important to note that device 102' is meant only as an example of equipment that may be used in accordance with embodiments consistent with the present disclosure, and is not meant to limit these various embodiments to any particular manner of implementation.

Device 102' may comprise system module 200 configured to manage device operations. System module 200 may include, for example, processing module 202, memory module 204, power module 206, user interface module 208 and communication interface module 210 that may be configured to interact with communication module 212. Device 102' may also include secure processing environment 112 configured to interact with at least user interface module 208 and possibly communication module 212. While communication module 212 and secure processing environment 112 have been shown separately from system module 200, the example implementation of device 102' is merely for the sake of explanation herein. Some or all of the functionality associated with communication module 212 and/or secure processing environment 112 may also be incorporated within system module 200.

In device 102', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of device 102' such as, for example, static RAM (SRAM) or Dynamic RAM (DRAM). ROM may include memories such as Bios or Unified Extensible Firmware Interface (UEFI) memory configured to provide instructions when device 102' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, fuel cell, etc.), and related circuitry configured to supply device 102' with the power needed to operate.

User interface module 208 may include equipment and software corresponding to that described in regard to user interface 104 in FIG. 1. This equipment and software may be configured to allow users to interact with device 102' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and output mechanisms (e.g., speakers, displays, lighted/flashing indicators, electromechanical components for vibration, motion, etc.). The equipment in user interface module 208 may be incorporated within device 102', or may be communicatively coupled to device 102' via a wired or wireless connection.

Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Video Interface (DVI). High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN. Wi-Fi, etc.) and long range wireless mediums (e.g., cellular wide-area radio communication technology, satellite-based communications, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In the embodiment illustrated in FIG. 2, secure processing environment 112 may be configured to interact with at least user interface module 208 and possibly communication module 212. For example, application 114 residing in secure processing environment 112 may receive encrypted input information from, and may provide encrypted output information to, user interface module 208. Secure processing environment 112 may also interact with communication module 212 in instances where, for example, components of application 114 may be distributed between multiple devices (e.g., as disclosed in regard to the example illustrated in FIG. 4). In one embodiment, secure processing environment 112 may be a trusted execution environment (e.g., based on secure enclave technology developed by the Intel Corporation). For example, the identity of programs (e.g., a cryptographic hash measurement of each program's contents) may be signed and stored inside each program. When the programs are loaded, the processor verifies that the measurement of the program (e.g., as computed by the processor) is identical to the measurement previously embedded inside the program. The signature used to sign the embedded measurement is also verifiable because the processor is provided with a public key used to verify the signature at program load time. This way malware can't tamper with the program without also altering its verifiable measurement. Malware also cannot spoof the signature because the signing key is secure with the program's author. Thus, the software may not be read, written to or altered by any malware. Moreover, in one embodiment more than one secure processing environment 112 may exist in device 102' or possibly amongst multiple networked devices. Different secure processing environments 104 (e.g., secure enclaves) may comprise software corresponding to different functional aspects of application 114. Having more than one secure processing environment 112 may provide additional security because one secure processing environment 112 becoming compromised (e.g., by malware) may still leave the security of the remaining secure processing environments 112 intact and protected.

Figure 3:
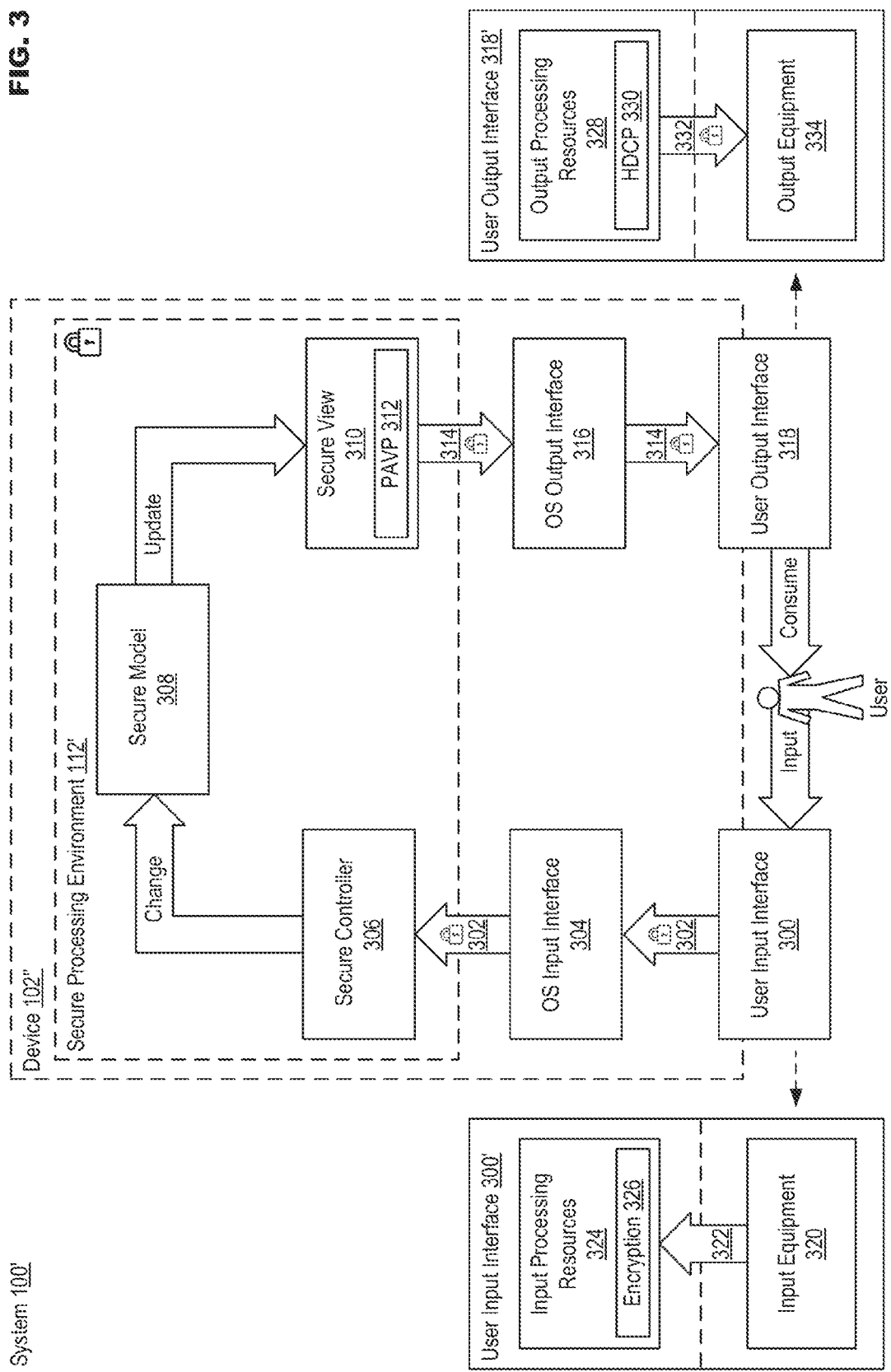
FIG. 3 illustrates an example modular implementation and communication flow in accordance with at least one embodiment of the present disclosure.

FIG. 3 illustrates an example modular implementation and communication flow in accordance with at least one embodiment of the present disclosure. While some specific encryption protocols have been identified in FIG. 3, embodiments consistent with the present disclosure are not limited to implementation using only these particular encryption protocols. Encryption protocols such as, for example, the Protected Audio Video Path (PAVP) Protocol and High-Bandwidth Digital Content Protection (HDCP) Protocol, both being developed by the Intel Corporation, have been relied upon herein only for the sake of explanation. Instead, the particular encryption protocols employed in example implementations consistent with the present disclosure may depend on, for example, the configuration of device 102' including the type of hardware platform, operating system, device power and/or processing limitations, etc., as well as the amount of security needed for inter-device communication, if necessary.

System 100' may include at least device 102". In interacting with device 102", a user may employ user input interface 300 (e.g., a part of more general user interface 104 disclosed in FIG. 1) to generate input information in device 102" (e.g., the user may type on a keyboard, may manipulate a pointing device, may speak and/or gesture into a microphone and/or camera, etc.). An example implementation of user input interface 300 is illustrated at 300'. User input interface 300' may comprise, for example input equipment 320 and input processing resources 324. Input equipment 320 may include example input mechanisms such as described in regard to user interface module 208 in FIG. 2. Input equipment 320 may be incorporated within device 102" (e.g., touch screen, integrated keyboard, mouse touch pad, etc.) or may be external to device 102" (e.g., a wired or wireless keyboard, mouse, microphone, camera, etc.). The input information generated by a user interacting with input equipment 320 may then be transmitted to input processing resources 324 as shown at 322. Input processing resources 324 may comprise hardware in device 102"(e.g., physical input equipment interfaces) and/or software (e.g., drivers residing in the OS of device 102") that allow input equipment 320 to interact with device 102" and may further include encryption functionality 326 to protect input information such as, for example, keystroke encryption to defeat key logging, packet encryption to protect the content of multimedia input information (e.g., audio and/or video), etc. In an alternative embodiment consistent with the present disclosure, the input information may be encrypted directly in input equipment 320 prior to being processed in input processing resources 324. Encrypted input information may then be provided to input interface 304 in encrypted form to protect its content as shown at 302.

In one embodiment. OS input interface 304 may represent OS features for routing information between different areas of device 102", and may be part of OS interface 108 as disclosed in FIG. 1. As illustrated in FIG. 3, OS input interface 304 may pass encrypted communication 302 to secure processing environment 112'. The input information may be passed in encrypted form to maintain data integrity, secrecy, etc. Secure processing environment 112' may include, for example, secure controller 306, secure model 308 and secure view component 310. Secure controller component 306 may, for example, receive encrypted communication 302 and decrypt secure communication 302 to obtain the input information. Secure controller component 306 may then provide any change instructions contained in the input information to secure model 308. For example, the input information may instruct secure model 308 to insert new information into secure model 308, delete information change information, undo previous changes, cause queries to be performed or initiate other activities, etc. Secure model 308 may comprise some or all of the information making up application 114, and thus, changes to secure model 308 may result in changes needing to be made to secure view component 310. Secure view component 310 may receive update notifications from secure model 308 and may generate output information (e.g., text/images/video to display, sound to be generated, etc.) based on the information in secure model 308. For example, the output information may be generated based on a variety of views (e.g., different modes of output such as display, speech, printing, etc., different configurations of output displays, etc.) that area available in secure view 310. Secure view component 310 may then encrypt the output information (e.g., using PAVP encryption as shown at 312) prior to transmitting the output information to OS output interface 316.

Similar to the manner of operation on the input side, OS output interface 316, which may also be part of OS interface 108 disclosed in FIG. 1, may handle routing of the encrypted output information. In one embodiment, output interface 316 may simply pass encrypted communication 314 received from secure view component 310 through to user output interface 318 in encrypted form to help maintain the integrity of the output data. In the same or a different embodiment. OS input interface 304 and OS output interface 316 may be the same interface (e.g., a single interface capable of two-way communication). User output interface 318 may then decrypt and present information to the user based on the decrypted output information. An example implementation for user output interface 318 is disclosed at 318' in FIG. 3. User output interface 318' may include, for example, output processing resources 328 and output equipment 334. Output processing resources 328 may include hardware (e.g., audio/ video chipsets, cards, etc.) and/or software (e.g., drivers residing in the OS of device 102") to decrypt secure communication 314 to obtain the output information and then process the output information into information ready for presentation. Examples of presentation may include displaying information, generating sound, etc. In one embodiment, the presentation information may then be provided directly to user output equipment 318 for presentation to the user. Output equipment 334 may include example output mechanisms such as described in regard to user interface module 208 in FIG. 2. In a different embodiment, output processing resources 328 may encrypt the presentation information (e.g., based on HDCP encryption protocol as shown at 330) and then provide the encrypted presentation information to output equipment 334 as shown at 332. Upon receiving the encrypted presentation information, output equipment 334 may decrypt the encrypted presentation information and present the presentation information to the user. The user may reinitiate the example operations disclosed in regard to system 100' by consuming the presented information (e.g., by viewing a display, listening to sound, etc.) and inputting information back into device 102' via user input interface 300.

Figure 4:
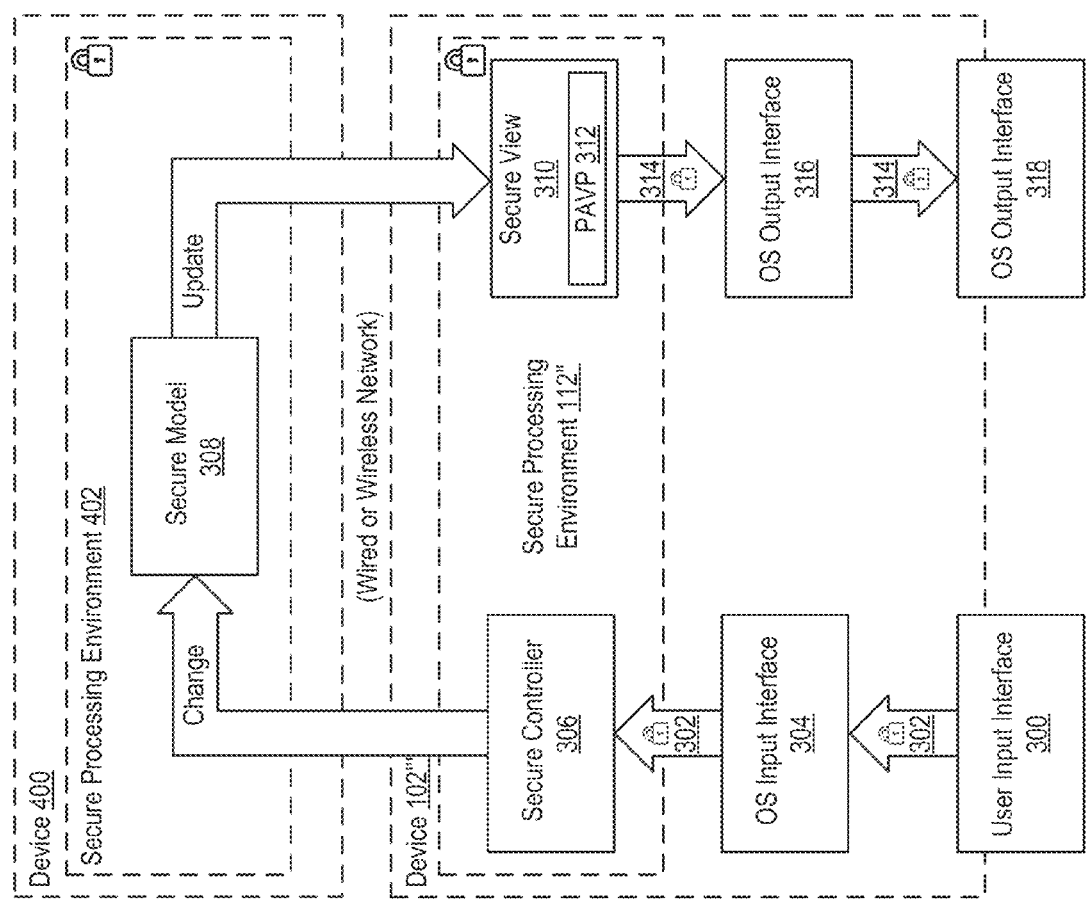
FIG. 4 illustrates an example distributed modular implementation and communication flow in accordance with at least one embodiment of the present disclosure.

FIG. 4 illustrates an example distributed modular implementation and communication flow in accordance with at least one embodiment of the present disclosure. In many instances the information utilized by the application during operation (e.g., secure model 308) may not reside on the same device with which the user is interacting. This may especially be the case in applications that operate over a wide-area network (e.g., Internet). To further employ the banking application example described in regard to FIG. 1, the main purpose of the banking application may be to obtain the present condition of a user's bank accounts. In performing this function, the application may query a remote resource (e.g., the banks servers) to obtain updated account status information. Secure model 308 may then be the account information records stored on the bank's server on which secure controller component 306 may act (e.g., in response to input from the user) and from which secure view component 310 may generate output information.

In the example illustrated in FIG. 4, secure processing environment 112" in device 102''' may include secure controller component 306 and secure view component 310 similar to FIG. 3. However, secure model 308 may instead reside in secure processing environment 402 in second device 400. For example, device 102''' may be a smart phone and device 400 may be a web server. Secure controller component 306, secure model component 308 and secure view component 310 may still behave in the manner described in FIG. 3, but some of the interaction may occur over a wired or wireless network. For example, secure controller component 306 may affect change in secure model component 308 over the network, and secure view component 310 may receive change notices from secure model component 308 over the network. The behavior from the standpoint of the user may appear to be unchanged, though response time may be somewhat slower based on the network connection. For example, device 400 (e.g., a network server) may be located geographically far away from device 102''' (e.g., a smart phone), and thus, the responsiveness of application 114 may depend on the distance between the devices, the speed of the network, etc.

FIG. 5 illustrates example operations for application integrity protection via secure interaction and processing in accordance with at least one embodiment of the present disclosure. In operation 500, input information may be received in a device. In operation 502 the input information may then be encrypted, and the encrypted input information may be passed to a secure processing environment in operation 504. In the secure processing environment the encrypted input information may then be decrypted in operation 506.

Operations 506 to 516 may be performed by an application executing in the secure processing environment. In operation 508 changes may be made to a secure model component in the application based on change instructions derived from the decrypted input information (e.g., provided by a secure controller component also in the application). A determination may then be made in operation 510 as to whether the change made to the secure model component will result in a change to the secure view component. If in operation 510 it is determined that the change to the secure model component will not result in a change to the secure view component, then in operation 512 the update of the application based on the input information may be complete. Operation 512 may optionally be followed by a return to operation 500 to prepare for new input information.

If in operation 510 it is determined that the change to the secure model component will result in a change to the secure view component, then in operation 514 any needed changes to the secure view component may be made based on the change to the secure model component. The secure view component may then encrypt new output information in operation 516, and may pass the encrypted new output information to user output interface in the device in operation 518. The user output interface in the device may then decrypt the encrypted new output information in operation 520 and present information based on the decrypted new output information in operation 522. The update of the application based on the input information may be complete in operation 512, which may optionally be followed by a return to operation 500 to prepare for new input information.

While FIG. 5 illustrates operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories. Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to application integrity protection via secure interaction and processing. For example, interaction with a user interface in a device may result in input information being generated. Following encryption, the input information may be conveyed to an application executing in a secure processing environment. The encrypted input information may be received, decrypted and processed by the application. An example application may include a secure controller component, a secure model component and a secure view component. The secure controller component may, for example, provide change instructions to the secure model component based on the decrypted input information. The secure model component may then, if necessary, provide a change notification to the secure view component based on the change instructions. The secure view component may then generate output information, which may be encrypted prior to being provided to the user interface for decryption, processing and presentation.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for application integrity protection via secure interaction and processing, as provided below.

Example 1

According to this example there is a provided a device including at least a user interface that is incorporated within or coupled to the device, an operating system interface to receive encrypted input information from, and to provide encrypted output information to, the user interface and a secure processing environment including at least an application to receive the encrypted input information from the operating system interface, decrypt the encrypted input information using a first encryption protocol, process the encrypted input information using the application to generate output information, encrypt the output information using a second encryption protocol and provide the encrypted output information to the operating system interface.

Example 2

This example includes the elements of example 1, wherein the user interface includes at least a user input interface to encrypt input information using the first encryption protocol, the input information being generated by user interaction with the user input interface.

Example 3

This example includes the elements of example 2, wherein the input interface comprises input equipment and input processing resources for operating the input equipment, the input information being encrypted in the input equipment before being passed to the input processing resources.

Example 4

This example includes the elements of example 2, wherein the input interface comprises input equipment and input processing resources for operating the input equipment, the input information being encrypted by the input processing resources after it is received from the input processing resources.

Example 5

This example includes the elements of any of examples 1 to 4, wherein the user interface includes at least a user output interface to decrypt the encrypted output information using the second encryption protocol and to present the decrypted output information.

Example 6

This example includes the elements of example 5, wherein the user output interface comprises at least output processing resources to decrypt the encrypted output information using the second encryption protocol, process the decrypted output information into presentation information and encrypt the presentation information using a third encryption algorithm.

Example 7

This example includes the elements of example 6, wherein the user output interface comprises at least output equipment to decrypt the encrypted presentation information using the third encryption protocol and present the decrypted presentation information.

Example 8

This example includes the elements of any of examples 6 to 7, wherein the second encryption protocol is a Protected Audio Video Path (PAVP) protocol and the third encryption protocol is a High-bandwidth Digital Copyright Protection (HDCP) protocol.

Example 9

This example includes the elements of any of examples 1 to 8, wherein the secure processing environment is a trusted execution environment.

Example 10

This example includes the elements of example 9, wherein the trusted execution environment is based on secure enclave technology.

Example 11

This example includes the elements of any of examples 1 to 10, wherein the application comprises a secure controller component.

Example 12

This example includes the elements of example 11, wherein the application comprises a secure model component.

Example 13

This example includes the elements of example 12, wherein the application comprises a secure view component.

Example 14

This example includes the elements of any of examples 1 to 10, wherein the application comprises at least a secure controller component and a secure view component to interact with a secure model component in a second secure processing environment residing on a second device coupled to the device via a wired or wireless communication network.

Example 15

This example includes the elements of any of examples 13 to 14, wherein the secure controller component is to receive the encrypted input information from the operating system interface, decrypt the encrypted input information and provide change instructions in the encrypted input information to the secure model component.

Example 16

This example includes the elements of any of examples 13 to 14, wherein the secure model component is to receive change instructions from the secure controller component, and if necessary, provide change notifications to the secure view component based on the received change instructions.

Example 17

This example includes the elements of any of examples 13 to 14, wherein the secure view component is to receive change notifications from the secure model component, generate the output information based on the received change notifications, encrypt the output information using the second encryption protocol and provide the encrypted output information to the operating system interface.

Example 18

This example includes the elements of example 1, wherein the user interface includes at least a user input interface to encrypt input information using the first encryption protocol, the input information being generated by user interaction with the user input interface and a user output interface to decrypt the encrypted output information using the second encryption protocol and to present the decrypted output information, the user output interface comprising at least output processing resources to decrypt the encrypted output information using the second encryption protocol, process the decrypted output information into presentation information and encrypt the presentation information using a third encryption algorithm, and output equipment to decrypt the encrypted presentation information using the third encryption protocol and present the decrypted presentation information.

Example 19

This example includes the elements of example 1, wherein the application comprises at least a secure controller component, a secure model component and a secure view component.

Example 20

This example includes the elements of example 19, wherein the secure controller component is to receive the encrypted input information from the operating system interface, decrypt the encrypted input information and provide change instructions in the encrypted input information to the secure model component.

Example 21

This example includes the elements of example 20, wherein the secure model component is to receive change instructions from the secure controller component, and if necessary, provide change notifications to the secure view component based on the received change instructions.

Example 22

This example includes the elements of example 21, wherein the secure view component is to receive change notifications from the secure model component, generate the output information based on the received change notifications, encrypt the output information using the second encryption protocol and provide the encrypted output information to the operating system interface.

Example 23

This example includes the elements of example 1, wherein the application comprises at least a secure controller component and a secure view component to interact with a secure model component in a second secure processing environment residing on a second device coupled to the device via a wired or wireless communication network.

Example 24

This example includes the elements of any of examples 1 to 23, wherein the device is a mobile communication device.

Example 25

This example includes the elements of any of examples 1 to 23, wherein the device is a mobile computing device.

Example 26

This example includes the elements of any of examples 1 to 23, wherein the device is a stationary computing device.

Example 27

According to this example there is a provided a method including at least receiving input information via a user interface in a device, encrypting the input information in the user interface, the input information being encrypted using a first encryption protocol, providing the encrypted input information through an operating system interface in the device to a secure processing environment in the device, the secure processing environment comprising at least an application, decrypting the encrypted input information using the first encryption protocol, processing the decrypted input information using the application to generate output information, encrypting the output information using a second encryption protocol and providing the encrypted output information to the user interface through the operating system interface.

Example 28

This example includes the elements of example 27, wherein the application comprises a secure controller component.

Example 29

This example includes the elements of example 28, wherein the application comprises a secure processing component.

Example 30

This example includes the elements of example 29, wherein the application comprises a secure view component.

Example 31

This example includes the elements of example 27, wherein the application comprises at least a secure controller component and a secure view component to interact with a secure model component in a second secure processing environment residing on a second device coupled to the device via a wired or wireless communication network.

Example 32

This example includes the elements of any of examples 30 to 31, wherein processing the decrypted input information comprises providing change instructions to the secure model component from the secure controller component, receiving change instructions from the secure controller component in the secure model component, and if necessary, providing change notifications to the secure view component.

Example 33

This example includes the elements of any of examples 30 to 31, wherein processing the decrypted input information comprises receiving change notifications from the secure model component, generating the output information based on the received change notifications, encrypting the output information using the second encryption protocol and providing the encrypted output information to the operating system interface.

Example 34

This example includes the elements of any of examples 27 to 33, and further comprises receiving the encrypted output information in the user interface, decrypting the encrypted output information using the second encryption protocol and processing the decrypted output information into presentation information.

Example 35

This example includes the elements of example 34, and further comprises encrypting the presentation information using a third encryption protocol and providing the encrypted presentation information to output equipment.

Example 36

This example includes the elements of example 35, and further comprises receiving the encrypted presentation information in the output equipment, decrypting the encrypted presentation information using the third decryption protocol and presenting the presentation information using the output equipment.

Example 37

This example includes the elements of any of examples 35 to 36, wherein the second encryption protocol is a Protected Audio Video Path (PAVP) protocol and the third encryption protocol is a High-bandwidth Digital Copyright Protection (HDCP) protocol.

Example 38

This example includes the elements of example 27, wherein processing the decrypted input information comprises providing change instructions to a secure model component in the application from a secure controller component in the application, receiving change instructions from the secure controller component in the secure model component, and if necessary, providing change notifications to a secure view component in the application.

Example 39

This example includes the elements of example 38, wherein processing the decrypted input information comprises receiving change notifications from the secure model component, generating the output information based on the received change notifications, encrypting the output information using the second encryption protocol and providing the encrypted output information to the operating system interface.

Example 40

This example includes the elements of example 39, and further comprises receiving the encrypted output information in the user interface, decrypting the encrypted output information using the second encryption protocol; processing the decrypted output information into presentation information, encrypting the presentation information using a third encryption protocol, providing the encrypted presentation information to output equipment, receiving the encrypted presentation information in the output equipment, decrypting the encrypted presentation information using the third decryption protocol and presenting the presentation information using the output equipment.

Example 41

This example includes the elements of example 40, wherein the application comprises at least a secure controller component and a secure view component to interact with a secure model component in a second secure processing environment residing on a second device coupled to the device via a wired or wireless communication network.

Example 42

This example comprises a system including at least a device, the system being arranged to perform the method of any of the methods set forth above in examples 27 to 41.

Example 43

This example comprises a chipset arranged to perform any of the methods set forth above in examples 27 to 41.

Example 44

This example comprises at least one machine readable medium comprising a plurality of instructions that, in response to be being executed on a computing device, cause the computing device to carry out any of the methods set forth above in examples 27 to 41.

Example 45

This example comprises at least one machine-readable storage medium having stored thereon, individually or in combination, instructions that when executed by one or more processors result in operations to perform any of the methods set forth above in examples 27 to 41.

Example 46

This example comprises a device configured for application integrity protection via secure interaction and processing, the device being arranged to perform any of the methods set forth above in examples 27 to 41.

Example 47

This example comprises a device having means to perform any of the methods set forth above in examples 27 to 41.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
    a user interface that is incorporated within or coupled to the device, the user interface including a user input interface wherein input information generated by user interaction with the user input interface is encrypted using a first encryption protocol;
    an operating system interface to receive the encrypted input information from the user interface; and
    a trusted execution environment isolated from an operating system of the device, the trusted execution environment including at least an application, wherein the application comprises at least a secure controller component, a secure model component and a secure view component;
    wherein the secure controller component is to:
        receive the encrypted input information from the operating system interface;
        decrypt the encrypted input information; and
            provide change instructions in the encrypted input information to the secure model component;
    wherein the secure model component is to:
        receive change instructions from the secure controller component; and
        when necessary, provide change notifications to the secure view component based on the received change instructions;
    the application to:
    process the decrypted input information using the application to generate output information;
    encrypt the output information using a second encryption protocol; and
    provide the encrypted output information to the operating system interface, wherein the operating system interface is to provide the encrypted output information to the user interface, the user interface including a user output interface to decrypt the encrypted output information using the second encryption protocol and to present the decrypted output information, where the application, the secure controller component, the secure model component and the secure view component are executed by a processor.

2. The device of claim 1, wherein the user output interface comprises at least:
    output processing resources to:
        decrypt the encrypted output information using the second encryption protocol;
        process the decrypted output information into presentation information; and
        encrypt the presentation information using a third encryption algorithm;
    and output equipment to:
        decrypt the encrypted presentation information using the third encryption protocol; and
        present the decrypted presentation information.

3. The device of claim 2, wherein the second encryption protocol is a Protected Audio Video Path (PAVP) protocol and the third encryption protocol is a High-bandwidth Digital Copyright Protection (HDCP) protocol.

4. The device of claim 1, wherein the secure view component is to:
receive change notifications from the secure model component;
generate the output information based on the received change notifications;
encrypt the output information using the second encryption protocol; and
provide the encrypted output information to the operating system interface.

5. The device of claim 1, wherein the application comprises at least a secure controller component and a secure view component to interact with a secure model component in a second trusted execution environment residing on a second device coupled to the device via a wired or wireless communication network.

6. A method, comprising:
receiving input information via a user interface in a device, wherein the input information is generated by user interaction with the user interface;
encrypting the input information in the user interface, the input information being encrypted using a first encryption protocol;
providing the encrypted input information through an operating system interface in the device to a trusted execution environment isolated from an operating system of the device, the trusted execution environment comprising at least an application, wherein the application comprises at least a secure controller component, a secure processing component and a secure view component;
decrypting the encrypted input information using the first encryption protocol:
processing the decrypted input information using the application to generate output information, wherein processing the decrypted input information comprises:
providing change instructions to the secure model component from the secure controller component;
receiving change instructions from the secure controller component in the secure model component; and
when necessary, providing change notifications to the secure view component;
encrypting the output information using a second encryption protocol;
providing the encrypted output information to the user interface through the operating system interface;
decrypting the encrypted output information using in the user interface using the second encryption protocol; and
presenting the decrypted output information.

7. The method of claim 6, wherein processing the decrypted input information comprises:
receiving change notifications from the secure model component;
generating the output information based on the received change notifications;
encrypting the output information using the second encryption protocol; and
providing the encrypted output information to the operating system interface.

8. The method of claim 6, wherein presenting the decrypted output information comprises:
processing the decrypted output information into presentation information;
encrypting the presentation information using a third encryption protocol; and
providing the encrypted presentation information to output equipment.

9. The method of claim 8, further comprising:
receiving the encrypted presentation information in the output equipment;
decrypting the encrypted presentation information using the third decryption protocol; and
presenting the presentation information using the output equipment.

10. The method of claim 8, wherein the second encryption protocol is a Protected Audio Video Path (PAVP) protocol and the third encryption protocol is a High-bandwidth Digital Copyright Protection (HDCP) protocol.

11. The method of claim 6, wherein the application comprises at least a secure controller component and a secure view component to interact with a secure model component in a second trusted execution environment residing on a second device coupled to the device via a wired or wireless communication network.

12. At least one non-transitory machine-readable storage medium having stored thereon, individually or in combination, instructions that when executed by one or more processors result in the following operations comprising:
receiving input information via a user interface in a device, wherein the input information is generated by user interaction with the user interface;
encrypting the input information in the user interface, the input information being encrypted using a first encryption protocol;
providing the encrypted input information through an operating system interface in the device to a trusted execution environment isolated from an operating system of the device, the trusted execution environment comprising at least an application, wherein the application comprises at least a secure controller component, a secure processing component and a secure view component;
decrypting the encrypted input information using the first encryption protocol;
processing the decrypted input information using the application to generate output information, wherein processing the decrypted input information comprises:
providing change instructions to the secure model component from the secure controller component;
receiving change instructions from the secure controller component in the secure model component; and
when necessary, providing change notifications to the secure view component;
encrypting the output information using a second encryption protocol;
providing the encrypted output information to the user interface through the operating system interface;
decrypting the encrypted output information using in the user interface using the second encryption protocol; and
presenting the decrypted output information.

13. The medium of claim 12, wherein processing the decrypted input information comprises:
receiving change notifications from the secure model component;
generating the output information based on the received change notifications;
encrypting the output information using the second encryption protocol; and
providing the encrypted output information to the operating system interface.

14. The medium of claim 12, wherein presenting the decrypted output information comprises:
- processing the decrypted output information into presentation information;
- encrypting the presentation information using a third encryption protocol; and
- providing the encrypted presentation information to output equipment.

15. The medium of claim 14, further comprising instructions that when executed by one or more processors result in the following operations comprising:
- receiving the encrypted presentation information in the output equipment;
- decrypting the encrypted presentation information using the third decryption protocol; and
- presenting the presentation information using the output equipment.

16. The medium of claim 14, wherein the second encryption protocol is a Protected Audio Video Path (PAVP) protocol and the third encryption protocol is a High-bandwidth Digital Copyright Protection (HDCP) protocol.

17. The medium of claim 12, wherein the application comprises at least a secure controller component and a secure view component to interact with a secure model component in a second trusted execution environment residing on a second device coupled to the device via a wired or wireless communication network.

\* \* \* \* \*